US009596644B2

(12) United States Patent
Zhang et al.

(10) Patent No.: US 9,596,644 B2
(45) Date of Patent: Mar. 14, 2017

(54) LOCAL CELL DISCOVERY IN MACRO-ASSISTED ENHANCED LOCAL AREA

(75) Inventors: Yuantao Zhang, Beijing (CN); Zhi Zhang, Beijing (CN); Jianchi Zhu, Beijing (CN); Haipeng Lei, Beijing (CN); Kodo Shu, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/422,921

(22) PCT Filed: Sep. 3, 2012

(86) PCT No.: PCT/CN2012/080929
§ 371 (c)(1),
(2), (4) Date: Feb. 20, 2015

(87) PCT Pub. No.: WO2014/032310
PCT Pub. Date: Mar. 6, 2014

(65) Prior Publication Data
US 2015/0230153 A1    Aug. 13, 2015

(51) Int. Cl.
*H04W 4/00* (2009.01)
*H04W 48/08* (2009.01)
(Continued)

(52) U.S. Cl.
CPC ........... *H04W 48/08* (2013.01); *H04W 48/16* (2013.01); *H04W 64/00* (2013.01);
(Continued)

(58) Field of Classification Search
USPC ...................................................... 455/434
See application file for complete search history.

(56) References Cited

U.S. PATENT DOCUMENTS

| 2011/0149878 A1* | 6/2011 | Ahmadi ............... H04W 48/20 370/329 |
| 2012/0002617 A1* | 1/2012 | Vujcic ................. H04W 74/002 370/329 |

(Continued)

FOREIGN PATENT DOCUMENTS

| WO | 2010064803 A2 | 6/2010 |
| WO | WO-2012/075052 A1 | 6/2012 |
| WO | 2012115489 A2 | 8/2012 |

OTHER PUBLICATIONS

International Search Report and Written Opinion received for corresponding Patent Cooperation Treaty Application No. PCT/CN2012/080929, dated Jun. 13, 2013, 10 pages.
(Continued)

*Primary Examiner* — Sam K Ahn
*Assistant Examiner* — Fabricio R Murillo Garcia
(74) *Attorney, Agent, or Firm* — Harrington & Smith

(57) ABSTRACT

A macro eNB (MeNB) triggers a small cell (eLA eNB) to transmit a sequence on a second frequency band using a triggering command that indicates a time to transmit the sequence. On a first frequency band the MeNB triggers at least one user equipment UE to detect the sequence on the second band, and this trigger also has a first indication of when the sequence will be transmitted. From a second indication the MeNB receives on the first band from the at least one UE in response to the triggering of the UE the MeNB can determine whether the UE is located proximate to the small cell. The indication may be as little as a single bit indicating whether the UE detected or not the sequence. The first and second bands may be on first and second component carriers that may not be synchronized to one another, and the aperiodic nature of the triggered sequences and detection reports saves UE power.

21 Claims, 4 Drawing Sheets

(51) Int. Cl.
  *H04W 48/16* (2009.01)
  *H04W 64/00* (2009.01)
  *H04W 72/04* (2009.01)
  *H04W 48/10* (2009.01)
  *H04W 84/04* (2009.01)

(52) U.S. Cl.
  CPC ........ *H04W 72/0453* (2013.01); *H04W 48/10* (2013.01); *H04W 84/045* (2013.01); *Y02B 60/50* (2013.01)

(56) References Cited

U.S. PATENT DOCUMENTS

| | | | | |
|---|---|---|---|---|
| 2013/0077580 | A1* | 3/2013 | Kang | H04B 7/061 370/329 |
| 2014/0036737 | A1* | 2/2014 | Ekpenyong | H04W 8/245 370/280 |
| 2014/0328309 | A1* | 11/2014 | Comstock | H04W 72/082 370/329 |
| 2015/0071146 | A1* | 3/2015 | Wei | H04W 8/005 370/311 |
| 2015/0312905 | A1* | 10/2015 | Seo | H04B 7/2656 370/280 |
| 2015/0350930 | A1* | 12/2015 | Sorrentino | H04L 25/0224 455/501 |

OTHER PUBLICATIONS

Nokia Siemens Networks et al. *Efficient Small Cell Detection Background Search* 3GPP Draft; R2-121623 Small Cell Detection Background Search, 3$^{rd}$ Generation Partnership Project (3GPP), Mobile Competence Centre; 650, Route Des Lucioles; F-06921 Sophia-Antipolis Cedex; France. vol. RAN WG2, No. Jeju, South Korea; 20120326-20120330, Mar. 20, 2012, XP050606380.

* cited by examiner

LOCAL CELL DISCOVERY IN MACRO-ASSISTED ENHANCED LOCAL AREA

RELATED APPLICATION

This application was originally filed as Patent Cooperation Treaty Application No. PCT/CN2012/080929 filed Sep. 3, 2012.

TECHNICAL FIELD

The exemplary and non-limiting embodiments of this invention relate generally to wireless communication systems, methods, devices and computer programs and, more specifically relate to identification and discovery of small cells in a heterogeneous radio network.

BACKGROUND

In the evolved universal terrestrial radio access network (E-UTRAN, also known as long term evolution LTE) there are ongoing discussions for a new carrier type for Release 11 or 12 or LTE-Advanced (LTE-A). Future deployments of LTE-A are to include heterogeneous deployments in which a macro eNB (MeNB) uses higher transmission power and so covers a larger geographic area in which lie one or more small cells, which may alternatively be termed pico eNBs, micro eNBs, home eNBs and the like. Any of these may be implemented as a remote radio head (RRH) of the MeNB. These small cells transmit with relatively low power and so can serve only a relatively smaller geographic area, which LTE-A terms an enhanced local area (eLA). Any given eLA may be served by one or more cells which may be clustered or grouped together from the perspective of the MeNB. FIG. 1 illustrates such a HetNet deployment with three non-clustered eLA eNBs 12, each under assistance of one MeNB 14. There is also shown one mobile terminal, more generally termed a user equipment (UE) 10, which is in close proximity to one of the small cells.

With respect to frequency, the MeNB 14 may be considered as occupying a primary component carrier (PCell) and each small cell 12 occupies a secondary component carrier (SCell) that is frequency-distinct from the PCell. The MeNB 14 may also operate one or more SCells but not the same SCells/frequencies as those used by the small cells 12, except if the MeNB 14 also operates a SCell as a small cell in which interference with a like-frequency eLA eNB-operated SCell is mitigated by the reduced power on that MeNB-operated SCell. The SCell of the small cells may conform to the new carrier type which is not yet fully defined. As location-based services become more important to the users of the UEs, the small cells are to be used to aid in the UE obtaining its own location information which the MeNB 14 collects.

A problem arises in the FIG. 1 deployment in that the UE 10 may or may not be attached to the small cell 12, and the MeNB 14 does not know enough about the UE's location to know that it is close to a given small cell 12. To this end there are ongoing discussions concerning the small cell transmitting discovery signals which UEs can use to discover small cells for measurements that may be used for obtaining the UE location. In current LTE standards discovery signals transmitted from the eNB are used for cell identification and carry the Cell Identifier (ID). For small cell discovery signals see for example document R1-120398 by NTT DOCOMO entitled ENHANCED CELL IDENTIFICATION FOR ADDITIONAL CARRIER TYPE (3GPP TSG RAN WG1 Meeting #68; Dresden, Germany; 6-10 Feb. 2012). To preserve UE battery power there is a long periodicity on the order of a few seconds between the transmitted discovery signals. This is because when the small cell SCell is not synchronized with the MeNB PCell, meaning the UE needs to do fairly extensive and power-intensive correlation operations to detect the discovery signal.

What is needed is a more efficient way for the MeNB to know when a UE is near or under the coverage of an eLA eNB so as not so consume so much power at the UEs which detect the small cells.

SUMMARY

According to a first exemplary aspect the invention there is a method comprising: triggering a small cell to transmit a sequence on a second frequency band using a triggering command that indicates a time to transmit the sequence; on a first frequency band, triggering at least one user equipment to detect the sequence on the second frequency band with a first indication of when the sequence will be transmitted; and from a second indication received on the first frequency band from the at least one user equipment in response to the triggering of the at least one user equipment, determining whether the at least one user equipment is located proximate to the small cell.

According to a second exemplary aspect the invention there is an apparatus comprising: at least one processor and at least one memory including computer program code. In this aspect the at least one memory and the computer program code are configured, with the at least one processor and in response to execution of the computer program code, to cause the apparatus to at least: trigger a small cell to transmit a sequence on a second frequency band using a triggering command that indicates a time to transmit the sequence; on a first frequency band, trigger at least one user equipment to detect the sequence on the second frequency band with a first indication of when the sequence will be transmitted; and from a second indication received on the first frequency band from the at least one user equipment in response to the triggering of the at least one user equipment, determine whether the at least one user equipment is located proximate to the small cell.

According to a third exemplary aspect the invention there is a computer readable memory storing a program of instructions which when executed by at least one processor result in actions comprising: triggering a small cell to transmit a sequence on a second frequency band using a triggering command that indicates a time to transmit the sequence; on a first frequency band, triggering at least one user equipment to detect the sequence on the second frequency band with a first indication of when the sequence will be transmitted; and from a second indication received on the first frequency band from the at least one user equipment in response to the triggering of the at least one user equipment, determining whether the at least one user equipment is located proximate to the small cell.

According to a fourth exemplary aspect the invention there is a method comprising: receiving on a first frequency band a trigger to detect a sequence on a second frequency band, the trigger comprising a first indication of when the sequence will be transmitted; and in response to detecting the sequence, sending a second indication on the first frequency band.

According to a fifth exemplary aspect the invention there is an apparatus comprising: at least one processor and at least one memory including computer program code. In this aspect the at least one memory and the computer program code are configured, with the at least one processor and in response to execution of the computer program code, to cause the apparatus to at least: receive on a first frequency band a trigger to detect a sequence on a second frequency band, the trigger comprising a first indication of when the sequence will be transmitted; and in response to detecting the sequence, sending a second indication on the first frequency band.

According to a sixth exemplary aspect the invention there is a computer readable memory storing a program of instructions which when executed by at least one processor result in actions comprising: receiving on a first frequency band a trigger to detect a sequence on a second frequency band, the trigger comprising a first indication of when the sequence will be transmitted; and in response to detecting the sequence, sending a second indication on the first frequency band.

These and other aspects are detailed further below.

DETAILED DESCRIPTION

Figure 1:
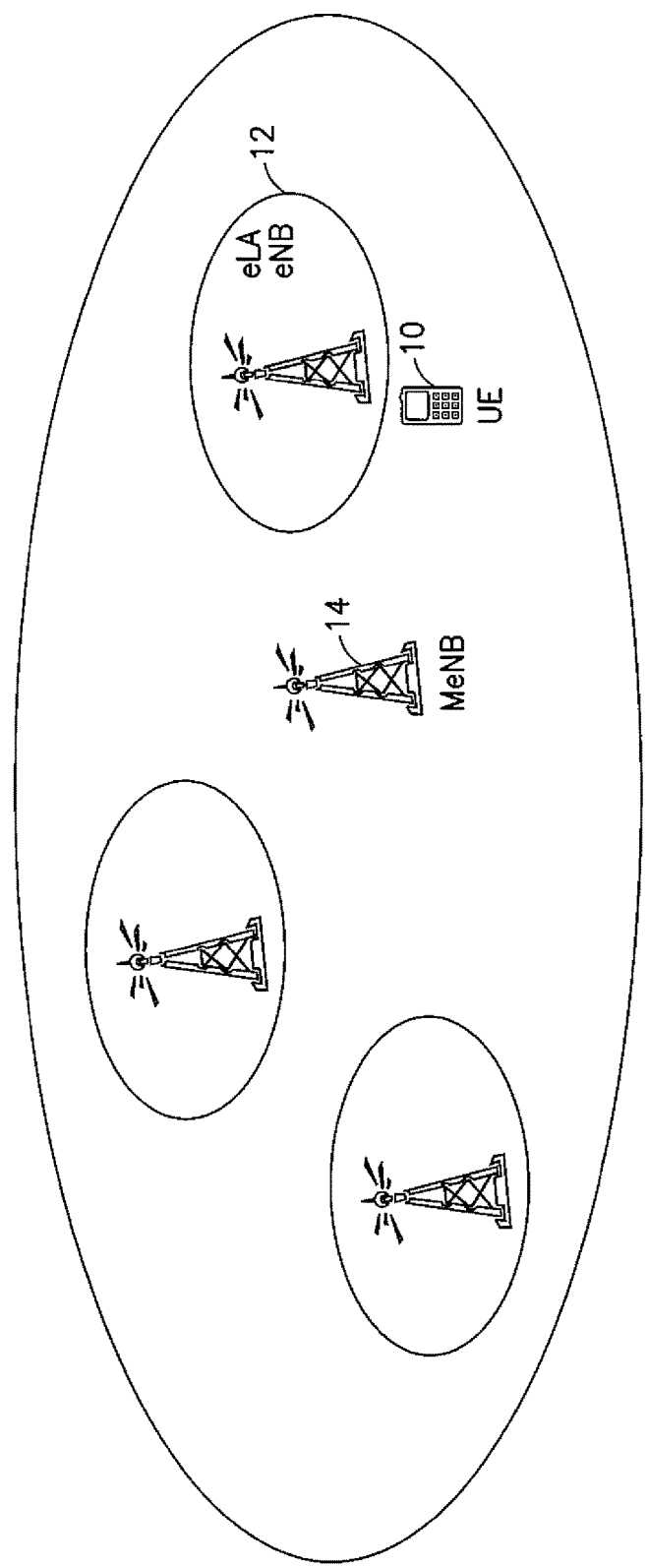
FIG. 1 is a schematic diagram of a macro cell/MeNB 14 in which lie three small cells 12 with a UE 10 near one of them, and is an exemplary radio environment in which these teachings may be practiced to advantage.

The examples below are in the context of the LTE and LTE-A radio access technologies but these are only non-limiting embodiments. These teachings may be utilized with any radio access technology that utilizes small cells which get assistance from a macro cell such as is described above by example for FIG. 1. For example, while the examples below use first and second component carriers, these teachings may be utilized with only different first and second frequency bands even if they are not in different component carriers and even if the operating radio technology does not use carrier aggregation.

The assumption below is that the SCell operated by the small cell 12 is unsynchronized with the PCell operated by the MeNB 14. This feature is one reason that the document R1-120398 referenced in the background section above proposes a long interval between discovery signals sent by the small cell, for the UE not previously attached to and synchronized with the small cell will have to search a wider window to find its discovery signal. In this regard the UE takes its measurements of the small cell on those discovery signals, for purposes of establishing the UE's location and for other purposes. According to the teachings below the long interval between discovery signals can still be used but there is still UE power savings with a more conventional shorter interval between them. UE battery consumption is reduced with these teachings since the MeNB 14 informs the UEs 10 when to listen for a sequence transmitted by the eLA eNB 12. The UE gets the small cell timing from receiving that sequence, which limits how large a window the UE must search for the small cell's discovery signal. Once they've heard the sequence they can know at least roughly the timing used on the small cell's carrier and the UEs can use this information to mitigate long correlation/search windows for the discovery signals due to the primary and secondary component carriers not being synchronized to one another. Whereas document R1-120398 saves UE power by making its UE searches for discovery signals less frequent, embodiments of these teachings save UE power primarily by shrinking the size of the window in which the UE must search for that discovery signal. The sequence in the below teachings is used for the UE to know the timing for the SCell operated by the small cell, and is used for the MeNB 14 to know which UEs 10 are proximate to small cells or small cell clusters 12. With this knowledge then the MeNB 14 can instruct the small cell or cluster 12 to transmit a discovery signal which enables those UEs 10 which received the earlier sequence to discover the small cell cluster 12 and take measurements of it for more precise location information. If the small cell 12 is transmitting discovery signals periodically, the MeNB 14 can inform the UEs 10 when to listen for the periodic discovery signal to be sent by the small cell 12 on its own SCell.

There is a data and/or control link between the large cell and the small cell. In the LTE-A system there is to be a peer X2 interface between the MeNB 14 and the eLA eNB 12. In other systems there may be some other type of wired or wireless communication interface between them. The small cell will be transmitting a reference sequence RS which the UE uses to measure the small cell. If there is more than one cell in a cluster or group, they will each transmit the same sequence and so the sequence is cell-common or cluster common. In one particular embodiment this transmitted sequence is a Zadoff-Chu sequence which has good correlation properties. In other embodiments the eLA eNB 12 can transmit some other sequence characterized by constant or near constant amplitude (and preferably also zero or near zero autocorrelation). The eLA eNB 12 transmits this common sequence in its discovery signal that also carries its cell or cluster ID.

Figure 2:
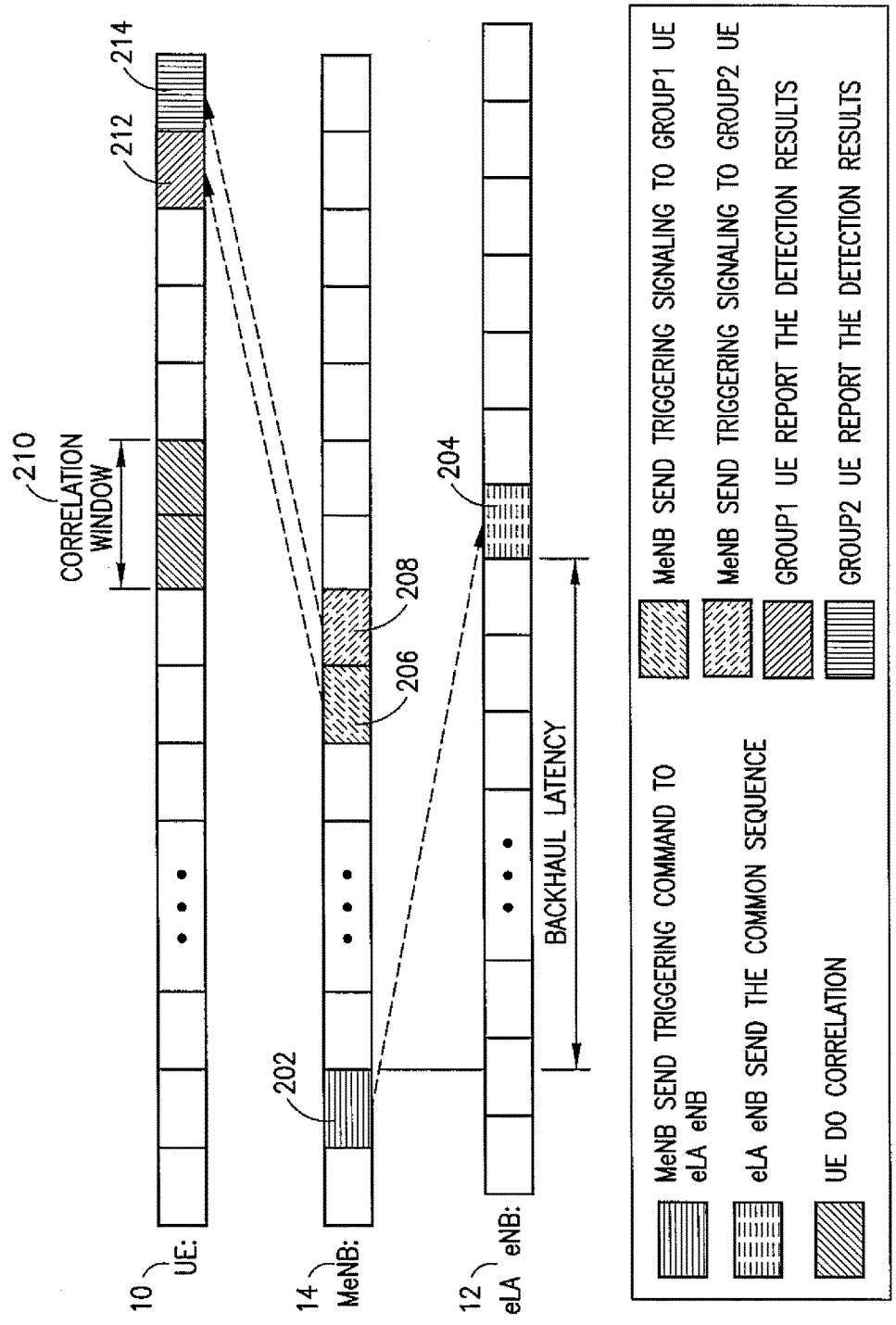
FIG. 2 is an exemplary signaling diagram for the MeNB triggering the small cell to send a sequence and two UE groups to detect it, according to an exemplary embodiment of these teachings.

The following signaling is detailed visually at the signaling diagram of FIG. 2. The MeNB 14 triggers an eLA cell-common or eLA cluster-common sequence via the X2 or other interface between MeNB 14 and eLA cells 12) to be transmitted in the timing indicated by the MeNB 14. The triggering command 202 to the eLA eNB 12 may be considered a first triggering command. FIG. 2 illustrates that the eLA eNB 12 and the MeNB 14 are not operating synchronously in that the radio subframes are not aligned with one another. The timing indicated in this first triggering command 202 provides that the eLA eNB 12 should transmit its common sequence in the subframe shown at 204, which accounts for the backhaul latency 203 in the X2 or other interface which is known in advance to the MeNB 14 and to the eLA eNB 12. The eLA cell 12 then transmits the eLA cell-common or eLA cluster-common sequence 204 to UEs in the subframe shown. The small cell/eLA eNB 12 transmits this sequence on the second component carrier, or more generally on a second frequency band.

Between those times 202 and 204, the MeNB 14 also triggers at 206 and 208 multiple UEs or multiple groups of UEs to detect the sequence. In the LTE-A system this may be through a new physical (PHY) layer signaling, or in the LTE or other systems another message might be re-used for this purpose and adapted to give the UEs the time at which to expect the small cell to transmit 204 its sequence. The legend of FIG. 2 indicates that triggering message 206 is sent to a first group of UEs and the other triggering message 208 is sent to a second group of UEs. FIG. 2 shows these different UE triggering messages 206, 208 being sent by the MeNB 14 in different subframes but they may be sent in the same subframe in other implementations of these teachings. Regardless, this UE triggering message 206, 208 may include at least an indication of the timing for the eLA sequence transmission, an indication of the frequency band index for detecting that sequence, and a detection indication for each UE. While in some embodiments or deployments the MeNB 14 may trigger only a single UE 10 for the sequence detection, for the case in which the MeNB 14 triggers a group of UEs for that detection it is efficient from a signaling perspective to trigger the whole group of UEs with a single triggering command. In this case there is then a detection indication for each UE in the group which indicates whether that UE is triggered or not for the sequence detection. In this regard the detection indication may be as little as a single bit. Regardless of how many UEs it addresses, this UE-directed trigger 206 and 208 may be considered a second triggering command which the MeNB 14 sends to the UE(s) on the first component carrier, or more generally on a first frequency band. At least the timing indication in the second triggering command may be considered as a first indication, to distinguish over the UE's detection report detailed below which may be considered as a second indication.

The UEs which receive one of the trigger messages 206, 208 then start their detection process according to the timing indicated in the PHY-layer or other command 206, 208. FIG. 2 illustrates this as occurring within a correlation window 210, since the timing may not line up exactly when the PCell on which the MeNB 14 communicates with the UEs 10 is not be synchronized with the SCell on which the eLA eNB 12 transmits its sequence.

Finally the UE(s) 10 which detected/measured the sequence in the correlation window 210 send to the MeNB 14 on the PCell (first frequency band) their measurement report of the small cell. FIG. 2 assumes two different UE groups are commanded/triggered at trigger messages 206 and 208 which lie in different subframes, and so this figure also shows the two different groups sending their respective measurement reports at 212 and 214. In one embodiment at least one of the time, frequency and code resource for the respective UEs to send their measurement report is determined by the UEs (and by the MeNB that receives those reports) implicitly from the index of the particular UE in its respective UE group (and possibly also the index of the group itself). This helps avoid interference among the measurement reports sent by different UEs of a same group and of different groups that measure the same small cell, and without any additional control signaling by the MeNB 14. In the minimum, for a single UE and a single small cell the measurement report may have as little as a single bit to express the detection results, that single bit indicating that the UE either detected the sequence on time or did not. This detection indication sent by the UEs may be considered as a second indication. For the case in which there are multiple clustered cells the UEs may each report the detected cluster identifier in addition to the above one-bit detection indication per UE.

According to the above example embodiments the cell-common or cluster-common signals are defined and aperiodically triggered to be transmitted, which differs from a periodic discovery signal transmission that has a long periodicity as detailed in the background section above. The eLA common sequence enables the UE(s) to learn the timing of the SCell used by the small cell, and also facilitates the MeNB 14 learning from the UE measurement reports whether there are UEs near or under eLA cell coverage. If the MeNB 14 were to send the sequence directly to the UE, the UE will not know if it is close to or within some eLA cell coverage area since the different transmit powers render the coverage area of the MeNB 14 different from the coverage area of the eLA eNB 12.

The MeNB 14 can use any of various criteria to choose which UE(s) to trigger for their sequence measurements. For example, if the MeNB 14 is becoming congested and sees a need to offload traffic it might survey one or several high traffic users, or even all UEs it serves, to take a measurement report of the common sequence.

There is a protocol for UEs to measure femto cells in conventional LTE specifications. However this is a UE-autonomous protocol rather than one directed by the eNB; the UE measures the femto cell primary/secondary synchronization signal which is transmitted quite frequently (every 5 ms) and so with little power consumed by the UE it can detect the closed subscriber group (CSG) ID and know that it is in range of a given femto cell and report this to the eNB with radio resource control (RRC) signaling. This cannot be adopted for the small cells under consideration here because these cells will be transmitting their discovery signals only with a much longer periodicity (several seconds) between them, which recalls the problem above in that there will be a large power consumption by the UE when trying to do autonomous detection for such a largely spaced signal.

For the case in which the MeNB 14 triggers a group of UEs to detect the sequence, generally that is the same group to which the eLA eNB 12 will send its sequence. But the eLA eNB 12 will not know which UEs might receive it, and in a given UE group some might detect the sequence and some might not, based on their position relative to the eLA eNB 12. So in this case there is no need for the eLA eNB 12 to know which UEs the MeNB 14 has triggered to detect its sequence.

In the examples above the energy savings arise from the smaller correlation window for the discovery signal as compared to the approach set forth at document R1-120398 and referenced in the background section above. There is additionally some power savings from the UEs according to these teachings detecting only aperiodically but the reduction of the discovery signal window size is the larger influence. This is because the UE can get the symbol timing of the eLA cell 12 by detecting the common sequence, which enables the shorter correlation time window to detect the discovery signal. This substantially reduces the needed number of correlations to detect the discovery signal, far surpassing any extra energy the UE expends in detecting the common sequence in window 210 of FIG. 2 and reporting its detection results.

Figure 3:
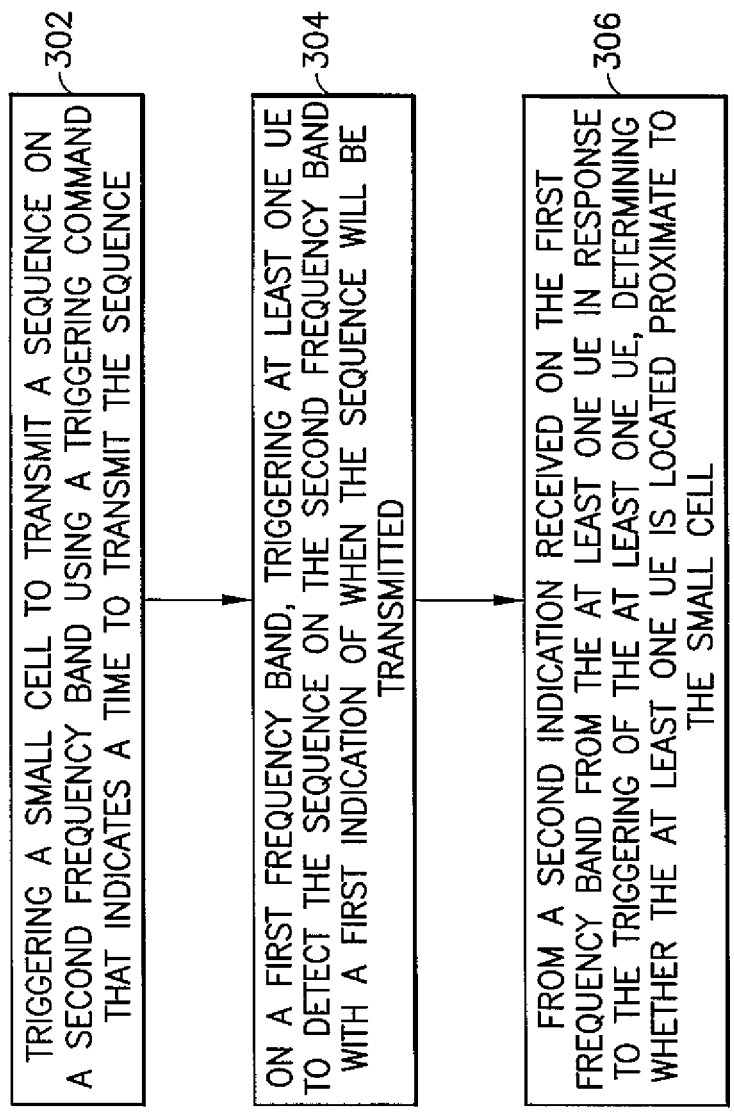
FIG. 3 is a process flow diagram from the perspective of the macro eNB or other network access node that illustrates a method, and a result of execution by one or more processors of a set of computer program instructions embodied on a computer readable memory, in accordance with the exemplary embodiments of this invention.

Some of the above principles of these teachings are summarized with reference to the process flow diagram of FIG. 3, which shows internal processes of the MeNB 14, or more generically for any radio access technology a base station or other such network access node. The various steps and messages summarized in FIG. 3 may be viewed as method steps, and/or as operations that result from operation of computer program code embodied on a memory and executed by a processor, and/or as a plurality of coupled logic circuit elements constructed to carry out the associated function(s).

At block 302 of FIG. 6 the MeNB 14 triggers a small cell to transmit a sequence on a second frequency band (e.g., a second component carrier) using a triggering command that indicates a time to transmit the sequence. Then at block 304 the MeNB 14 uses a first frequency band (e.g., a first component carrier) to trigger at least one UE 10 to detect the sequence on the second frequency band/second component carrier and that triggering includes a first indication of when the sequence will be transmitted. FIG. 3 concludes with block 306, where from an indication received on the first frequency band/first component carrier from the at least one UE in response to the triggering at block 304, the MeNB 14 determines whether the at least one UE is located proximate to the small cell. In the above examples if the single detection bit indicates the UE detected the small cell 12 then the MeNB 14 knows the UE is nearby to it, otherwise the MeNB 14 concludes the UE 10 is not near the small cell 12.

In the above more specific non-limiting examples the triggering at block 302 and 304 is aperiodic, and the first frequency band is on a first component carrier that is not synchronized with a second component carrier that comprises the second frequency band. The first component carrier is in the above examples a PCell but it may in other implementations be a SCell different from the SCell used by the small cell 12. And in a particularly detailed embodiment above the triggering command that the MeNB 14 sends to the eLA eNB 12 is a first triggering command, and the second triggering command 206, 208 that the MeNB 14 sends to the UEs 10 comprises at least indications of when the sequence will be transmitted, and also of the second frequency band. For example, the indication of the second frequency band can be an index which the UEs can use to know which of several bands the small cell 12 will send the sequence.

Also within the above examples, the MeNB's small cell triggering command indicates a time to transmit the sequence and is used to trigger a cluster of small cells to transmit the same sequence on the second frequency band. In a similar vein the triggering of the UE at block 304 was triggering a group of UEs, with a detection indicator for each UE in the group that indicates whether the respective UE is or is not triggered to receive the sequence on the second frequency band. As specifically shown at FIG. 2, two groups of UEs are triggered, a first group in a first subframe, and a second group of UEs are triggered in a second subframe to receive the sequence on the second frequency band. These two groups are triggered with the same first indication of when the sequence will be transmitted.

Above it was also detailed mapping of the resource in which lie the UE detection results. Specifically, the second indication of block 306 which is the UE's detection results or detection report, is sent in a resource (time, frequency or code resource) that maps implicitly, for each respective UE, from an index of the respective UE and an index of the respective UE's group.

Now that the MeNB 14 has collected all of the detection reports and from them which UEs are near which small cells 12, the MeNB can then instruct the small cell to transmit a discovery signal which enables the UE near that small cell to discover it. Or in another embodiment if the small cell 12 is transmitting its discovery signal periodically, the MeNB 12 can inform on the PCell the UE(s) near that small cell when they should listen to the SCell for the small cell's discovery signal.

From the UE's perspective it is a bit simpler than the MeNB 14 since the UE does not see block 302 of FIG. 3. The UE 10 receives on a first frequency band/first CC a trigger to detect a sequence on a second frequency band, and this trigger comprising a first indication of when the sequence will be transmitted. Then in response to detecting the sequence, the UE sends a second indication on the first frequency band, so the MeNB 14 can know if the UE 10 is proximate to the small cell that transmitted the sequence that the UE detected.

In the specific examples above the UE receives the trigger from a macro access node, receives the sequence from a local area access node, and the triggering of the UE is aperiodic. As detailed above, in one non-limiting implementation the second indication comprises a single bit indicating whether the sequence was or was not detected on the second frequency band. Also detailed above by non-limiting example, the trigger comprises at least an indication of when the sequence will be transmitted and an indication of the second frequency band. Then after sending the second indication on the first frequency band, the UE discovers the small cell by receiving a discovery signal from the small cell on the second frequency band.

Figure 4:
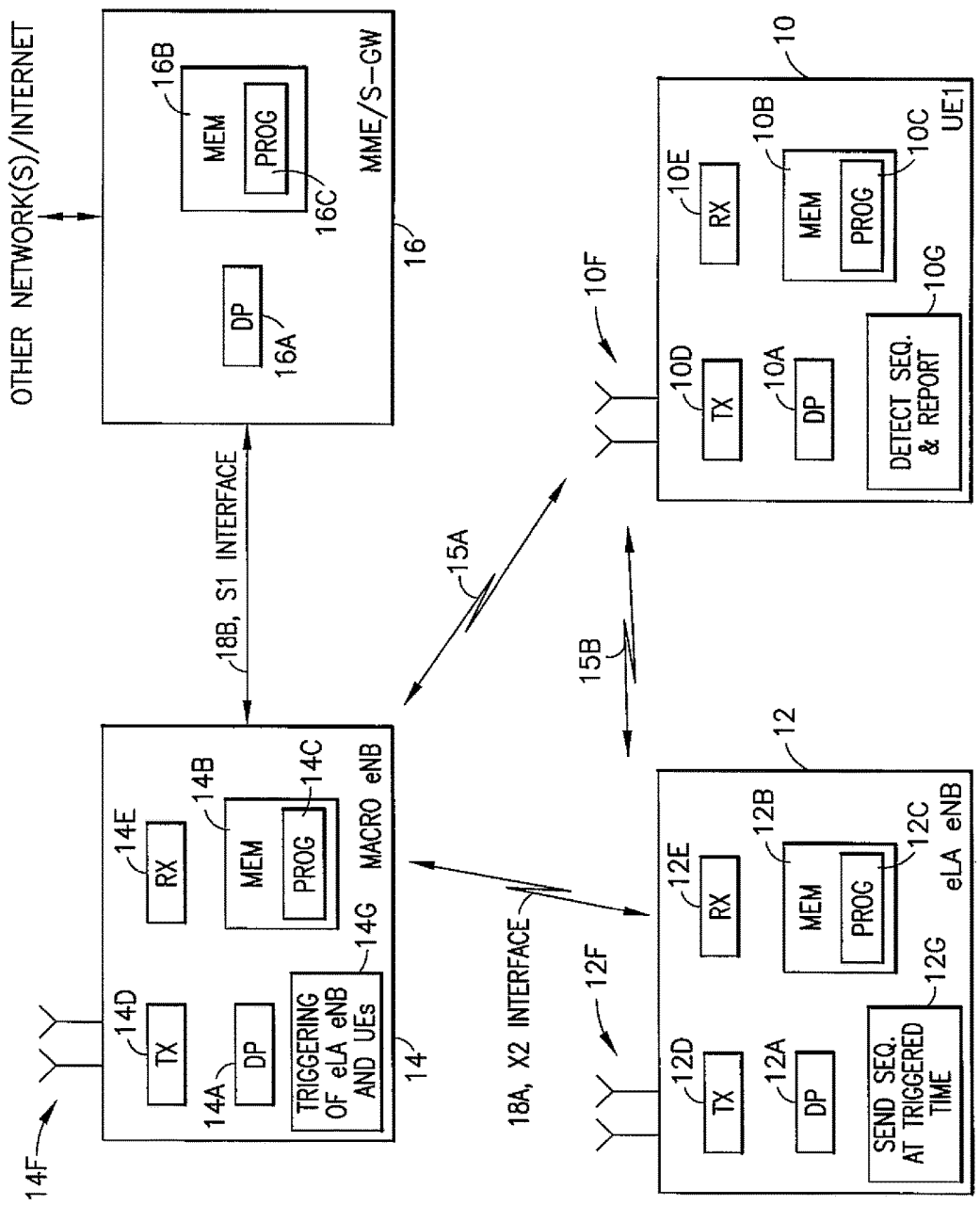
FIG. 4 is a simplified block diagram of a macro eNB/network access node/eNB and an eLA eNB/small cell and a UE which are exemplary electronic devices suitable for use in practicing the exemplary embodiments of the invention.

Reference is made to FIG. 4 for illustrating a simplified block diagram of various electronic devices and apparatus that are suitable for use in practicing the exemplary embodiments of this invention. In FIG. 4 a wireless network is adapted for communication over a wireless link 15A on a first component carrier with an apparatus, such as a mobile communication device which above is referred to as a UE 10, via a network access node such as a MeNB 14. The network may include a network control element 16 that may include mobility management entity/serving gateway MME/S-GW functionality that is specified for LTE/LTE-Advanced. The MME/S-GW 16 also provides connectivity with a different network, such as a publicly switched telephone network and/or a data communications network (e.g., the Internet). While only one wireless link 15A is shown between the MeNB 14 and the UA 10, in an embodiment it represents multiple logical and physical channels.

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transmitter 10D and receiver 10E for bidirectional wireless communications with the MeNB 14 and with a small cell such as the eLA eNB 12 via one or more antennas 10F (two shown). The UE 10 may have one or more than one radios 10D/E for communicating with the MeNB 14 and the eLA eNB 12. While only one eLA eNB 12 is shown the UE 10 may also be in communication with others or there may be other small cells in the system as shown at FIG. 1 with which the UE 10 is not in contact presently as is known in the LTE/LTE-A systems. One of the PROGs 10C in the UE 10 specific to these teachings is shown at block 10G as causing the UE 10 to detect a sequence from the eLA eNB 12 as triggered by the MeNB 14 and report the detection results to the MeNB 14 as detailed in the various embodiments above.

The MeNB 14 also includes a controller, such as a computer or a data processor (DP) 14A, a computer-readable memory medium embodied as a memory (MEM) 14B that stores a program of computer instructions (PROG) 14C, and suitable RF transmitters 14D and receivers 14E for communication with the UE 10 via one or more antennas 14F (two shown). The MeNB 14 is coupled via a data/control path 18B to the MME/S-GW 16. The path 18A may be implemented as the Si interface known in the E-UTRAN system. The MeNB 14 may also be coupled to the eLA eNB 12 via another data/control path 18A which may be implemented as the X2 interface known in the E-UTRAN system. One of the PROGs 14C in the MeNB 14 specific to these teachings is shown at block 14G as causing the MeNB 14 to trigger the eLA eNB to send, and the UE 10 to detect, a sequence on the second component carrier and determine whether the UE is proximate to the eLA eNB 12 from a report by the UE of the results of its detecting, as detailed in the various embodiments above.

The eLA eNB 12 also includes a controller, such as a computer or a data processor (DP) 12A, a computer-readable memory medium embodied as a memory (MEM) 12B that stores a program of computer instructions (PROG) 12C, and an RF transmitter 12D and receiver 12E for communication with the UE 10 on a wireless link 15B using a different second component carrier via one or more antennas 12F (two shown). One of the PROGs 12C in the eLA eNB 12 specific to these teachings is shown at block 12G as the eLA eNB 12 sending a sequence on the second component carrier as triggered by the MeNB 14, as is detailed above in the various embodiments.

At least one of the PROGs 10C/10G, 12C/12G and 14C/14G is assumed to include program instructions that, when executed by the associated DP, enable the device to operate in accordance with the exemplary embodiments of this invention, as detailed above. That is, the exemplary embodiments of this invention may be implemented at least in part by computer software executable by the DP 10A of the UE 10 and/or by the DP 14A of the MeNB 14 and/or by the DP 12A of the eLA eNB 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B, 12B and 14B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

In general, the various exemplary embodiments may be implemented in hardware or special purpose circuits, software, logic or any combination thereof. For example, some aspects may be implemented in hardware, while other aspects may be implemented in embodied firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, embodied software and/or firmware, special purpose circuits or logic, general purpose hardware or controller or other computing devices, or some combination thereof, where general purpose elements may be made special purpose by embodied executable software.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

While the exemplary embodiments have been described above in the context of the E-UTRAN/LTE-A system, it should be appreciated that the exemplary embodiments of this invention are not limited for use with only this one particular type of wireless communication system that uses resource allocations for scheduling data.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising:
    at least one processor; and
    at least one non-transitory memory including computer program code,
    in which the at least one non-transitory memory and the computer program code are configured, with the at least one processor and in response to execution of the computer program code, to cause the apparatus to at least:
    trigger a small cell to transmit a sequence on a second frequency band using a triggering command that indicates a time to transmit the sequence;
    on a first frequency band, trigger at least one user equipment to detect the sequence on the second frequency band with a first indication of when the sequence will be transmitted; and
    from a second indication received on the first frequency band from the at least one user equipment in response to the triggering of the at least one user equipment, determine whether the at least one user equipment is located proximate to the small cell;
    wherein the triggering command is transmitted via an X2 interface, the sequence is a cell-common sequence or a cluster-common sequence, the apparatus comprises a macro access node or one or more components thereof, and the small cell is a local area access node.

2. The apparatus according to claim 1, wherein the triggering is aperiodic.

3. The apparatus according to claim 1, wherein the first frequency band is on a first component carrier that is not synchronized with a second component carrier that comprises the second frequency band.

4. The apparatus according to claim 1, wherein the second indication comprises a single bit indicating whether the at least one user equipment detected the sequence being transmitted on the second frequency band.

5. The apparatus according to claim 1, wherein the triggering command that indicates the time to transmit the sequence is a first triggering command and the triggering of the at least one user equipment is by a second triggering command that comprises at least the first indication of when the sequence will be transmitted and an indication of the second frequency band.

6. The apparatus according to claim 1, wherein triggering the at least one user equipment comprises triggering a group of user equipments with a detection indicator for each user equipment in the group that indicates whether the respective user equipment is or is not triggered to receive the sequence on the second frequency band.

7. The apparatus according to claim 6, wherein the group of user equipments is a first group which is triggered in a first subframe, and the execution of the computer program code causes the apparatus to trigger, in a second subframe, a second group of user equipments to receive the sequence on the second frequency band with the same first indication of when the sequence will be transmitted.

8. The apparatus according to claim 6, wherein the second indication received on the first frequency band is received from each of the respective user equipments in a resource that maps implicitly from an index of the respective user equipment and an index of the respective user equipment's group.

9. The apparatus according to claim 1, wherein triggering the small cell comprises using the triggering command that indicates the time to transmit the sequence to trigger a cluster of small cells to transmit the same sequence on the second frequency band.

10. The apparatus according to claim 1, wherein the at least one non-transitory memory and the computer program code are further configured, with the at least one processor and in response to execution of the computer program code, to cause the apparatus to at least, if the determining is that the at least one user equipment is located proximate to the small cell, instruct the small cell to transmit a discovery signal that enables the at least one first user equipment to discover the small cell.

11. A method, by a user equipment, comprising:
receiving, from a macro access node on a first frequency band, a trigger to detect a sequence transmitted on a second frequency band by a local area access node, the trigger comprising a first indication of when the sequence will be transmitted by the local area access node where transmission of the sequence is triggered based on a triggering command from the macro access node to the local area access node via an X2 interface; and
in response to detecting the sequence transmitted by the local area access node, sending to the macro access node a second indication on the first frequency band, the second indication usable for determining whether the user equipment is proximal to the local area access node;
wherein the sequence is a cell-common sequence or cluster-common sequence.

12. The method according to claim 11, wherein the triggering is aperiodic.

13. The method according to claim 11, wherein the trigger comprises at least indications of when the sequence will be transmitted and of the second frequency band.

14. The method according to claim 11, further comprising: after sending the second indication on the first frequency band, discovering the local area access node by receiving from the local area access node on the second frequency band a discovery signal.

15. A user equipment comprising:
at least one processor; and
at least one non-transitory memory including computer program code,
in which the at least one non-transitory memory and the computer program code are configured, with the at least one processor and in response to execution of the computer program code, to cause the user equipment to at least:
receive, from a macro access node on a first frequency band, a trigger to detect a sequence transmitted on a second frequency band by a local area access node, the trigger comprising a first indication of when the sequence will be transmitted by the local area access node where transmission of the sequence is triggered based on a triggering command from the macro access node to the local area access node via an X2 interface; and
in response to detecting the sequence transmitted by the local area access node, sending to the macro access node a second indication on the first frequency band, the second indication usable for determining whether the user equipment is proximal to the local area access node;
wherein the sequence is a cell-common sequence or cluster-common sequence.

16. The user equipment according to claim 15, wherein the triggering is aperiodic.

17. The user equipment according to claim 15, wherein the second indication comprises a single bit indicating whether the sequence was or was not detected on the second frequency band.

18. The user equipment according to claim 15, wherein the trigger comprises at least indications of when the sequence will be transmitted and of the second frequency band.

19. The user equipment according to claim 15, wherein the at least one non-transitory memory and the computer program code are further configured, with the at least one processor and in response to execution of the computer program code, to cause the user equipment to at least:
after sending the second indication on the first frequency band, discover the local area access node by receiving from the local area access node on the second frequency band a discovery signal.

20. The user equipment according to claim 15, wherein the sequence is detected within a discovery signal that carries the sequence and at least one of a cell identifier and a cluster identifier.

21. A non-transitory computer readable memory storing a program of instructions which when executed by at least one processor result in actions by a user equipment comprising:
receiving, from a macro access node on a first frequency band, a trigger to detect a sequence transmitted on a second frequency band by a local area access node, the trigger comprising a first indication of when the sequence will be transmitted by the local area access node where transmission of the sequence is triggered based on a triggering command from the macro access node to the local area access node via an X2 interface; and in response to detecting the sequence transmitted by the local area access node, sending to the macro access node a second indication on the first frequency band, the second indication usable for determining whether the user equipment is proximal to the local area access node;

wherein the sequence is a cell-common sequence or cluster-common sequence.

\* \* \* \* \*